July 2, 1963 L. G. METZGER 3,095,842
APPARATUS AND CONTROL DEVICE FOR FORMING
BELT LOOPS ON GARMENTS
Filed April 25, 1961 8 Sheets-Sheet 1

INVENTOR.
LOUIS G. METZGER
BY
ATTORNEY

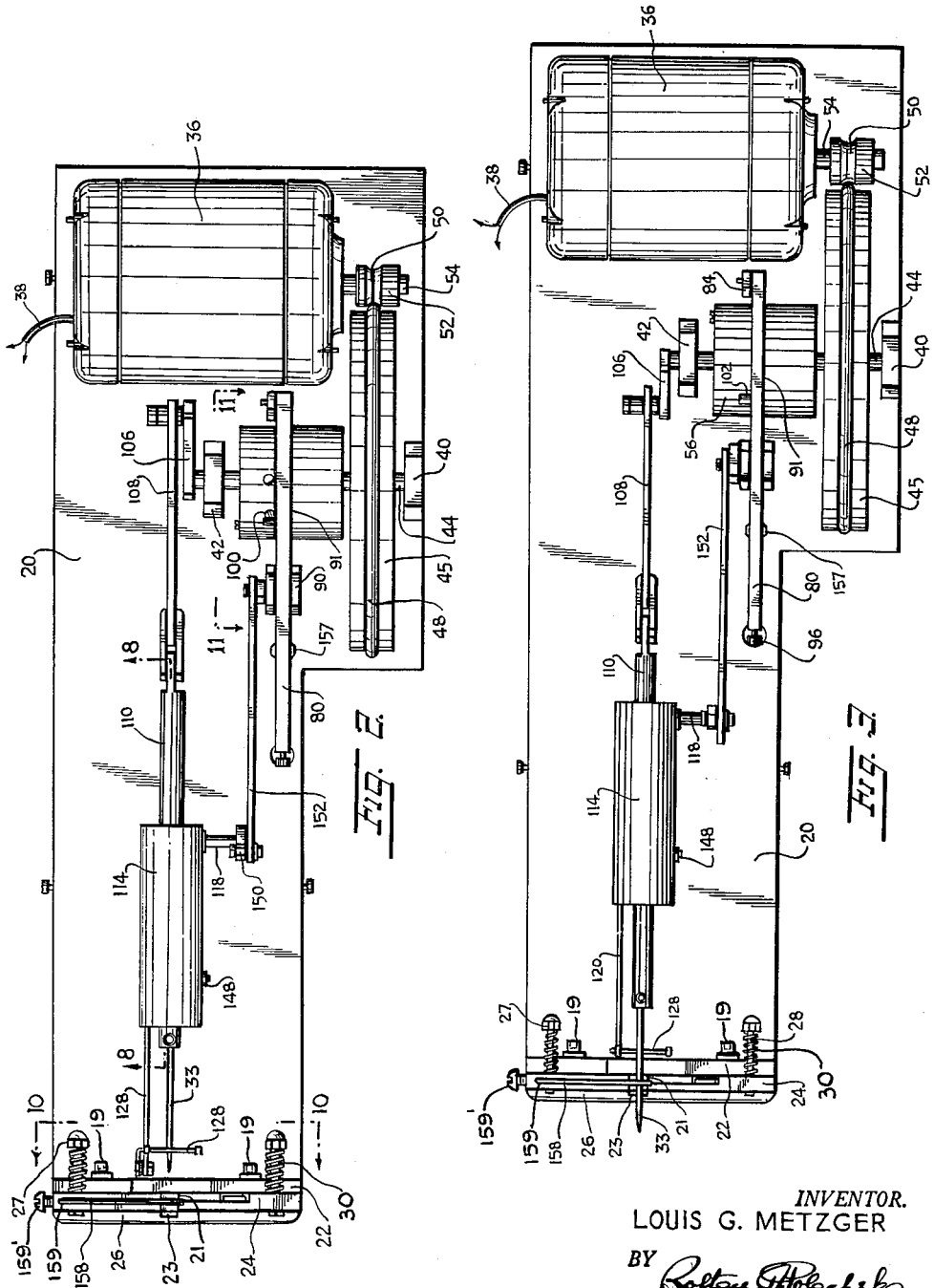

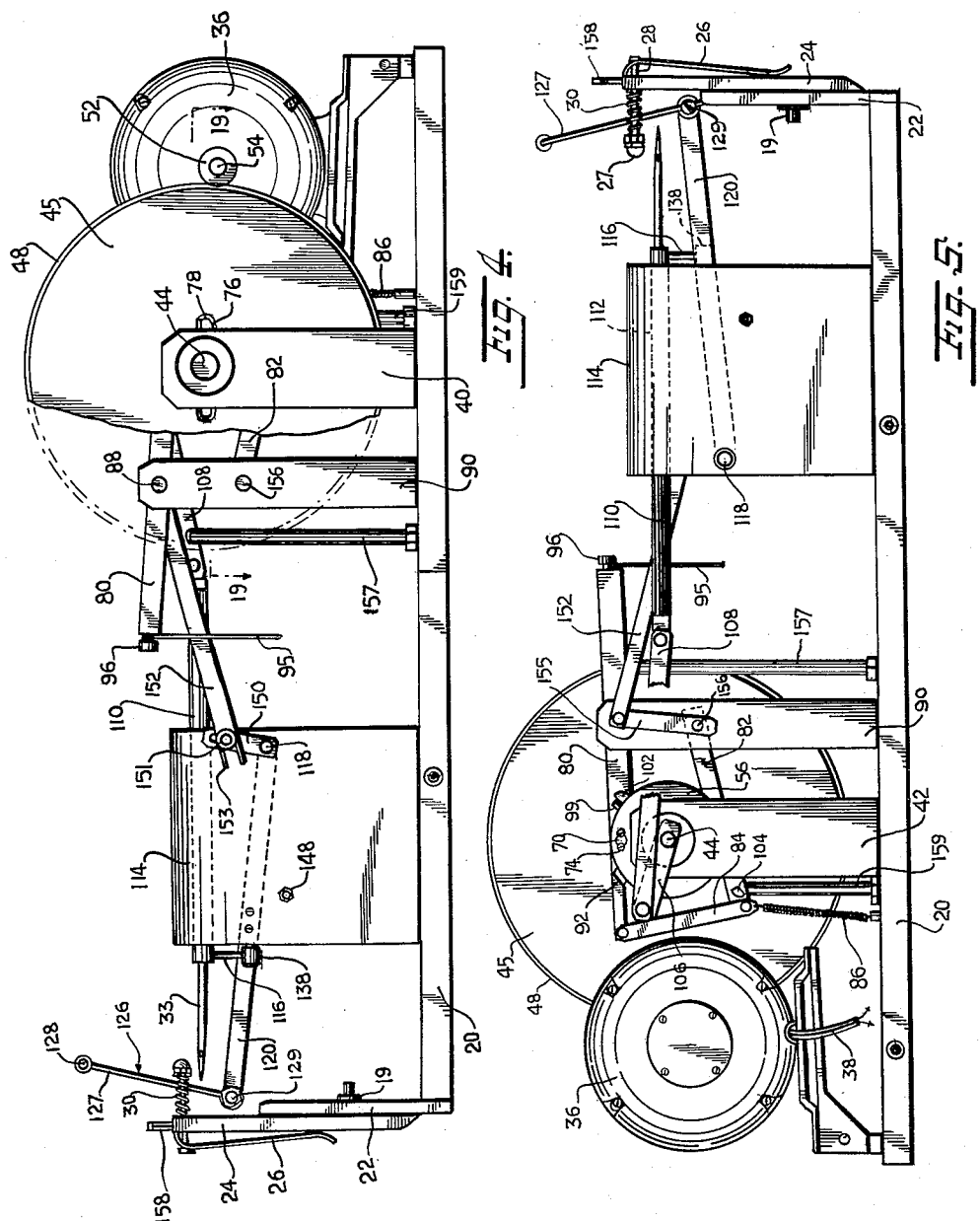

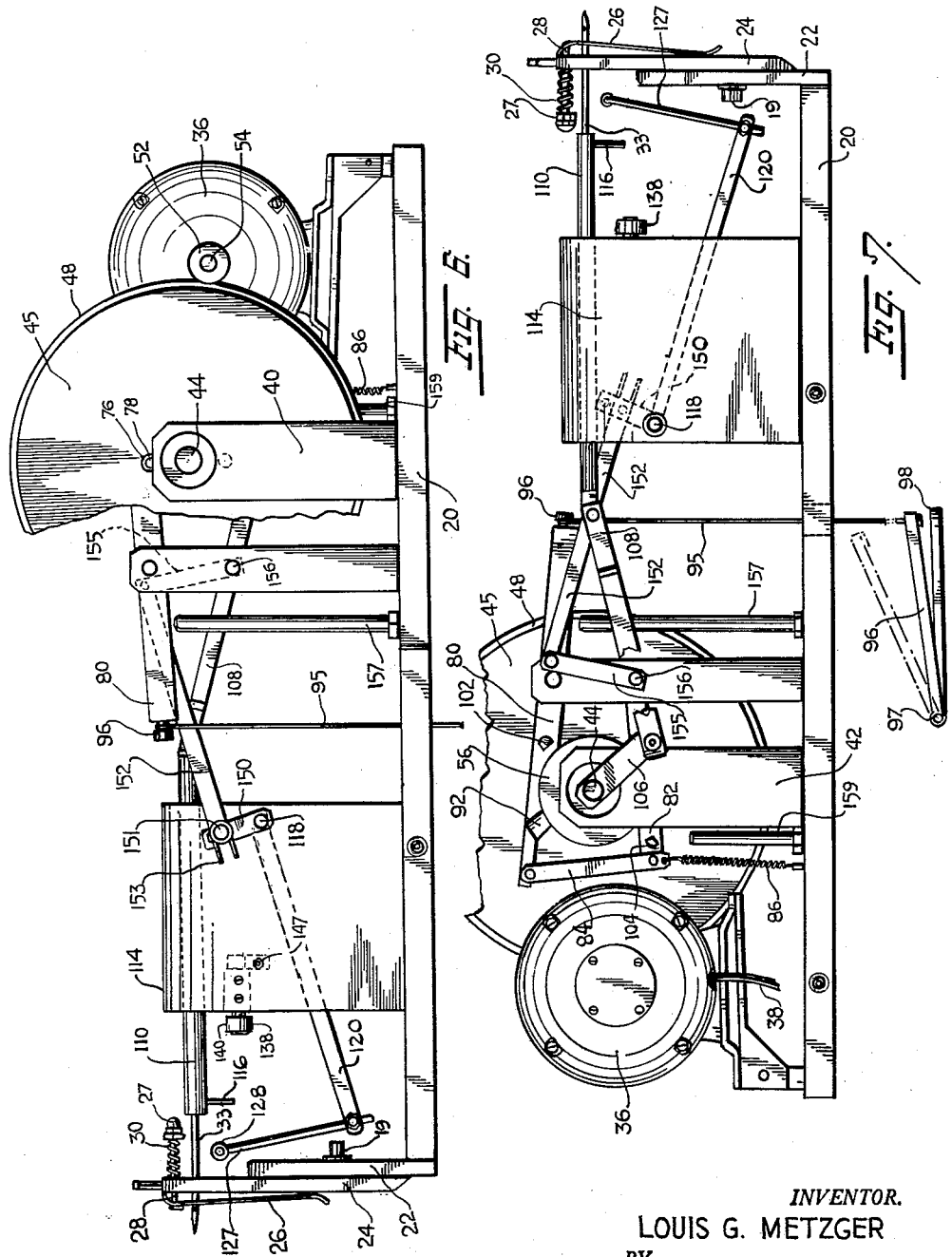

July 2, 1963

L. G. METZGER 3,095,842

APPARATUS AND CONTROL DEVICE FOR FORMING BELT LOOPS ON GARMENTS

Filed April 25, 1961

INVENTOR.
LOUIS G. METZGER
BY
*Zoltan H. Polachek*
ATTORNEY

July 2, 1963

L. G. METZGER 3,095,842

APPARATUS AND CONTROL DEVICE FOR FORMING BELT LOOPS ON GARMENTS

Filed April 25, 1961

INVENTOR.
LOUIS G. METZGER

BY

ATTORNEY

July 2, 1963 L. G. METZGER 3,095,842
APPARATUS AND CONTROL DEVICE FOR FORMING
BELT LOOPS ON GARMENTS
Filed April 25, 1961 8 Sheets-Sheet 7
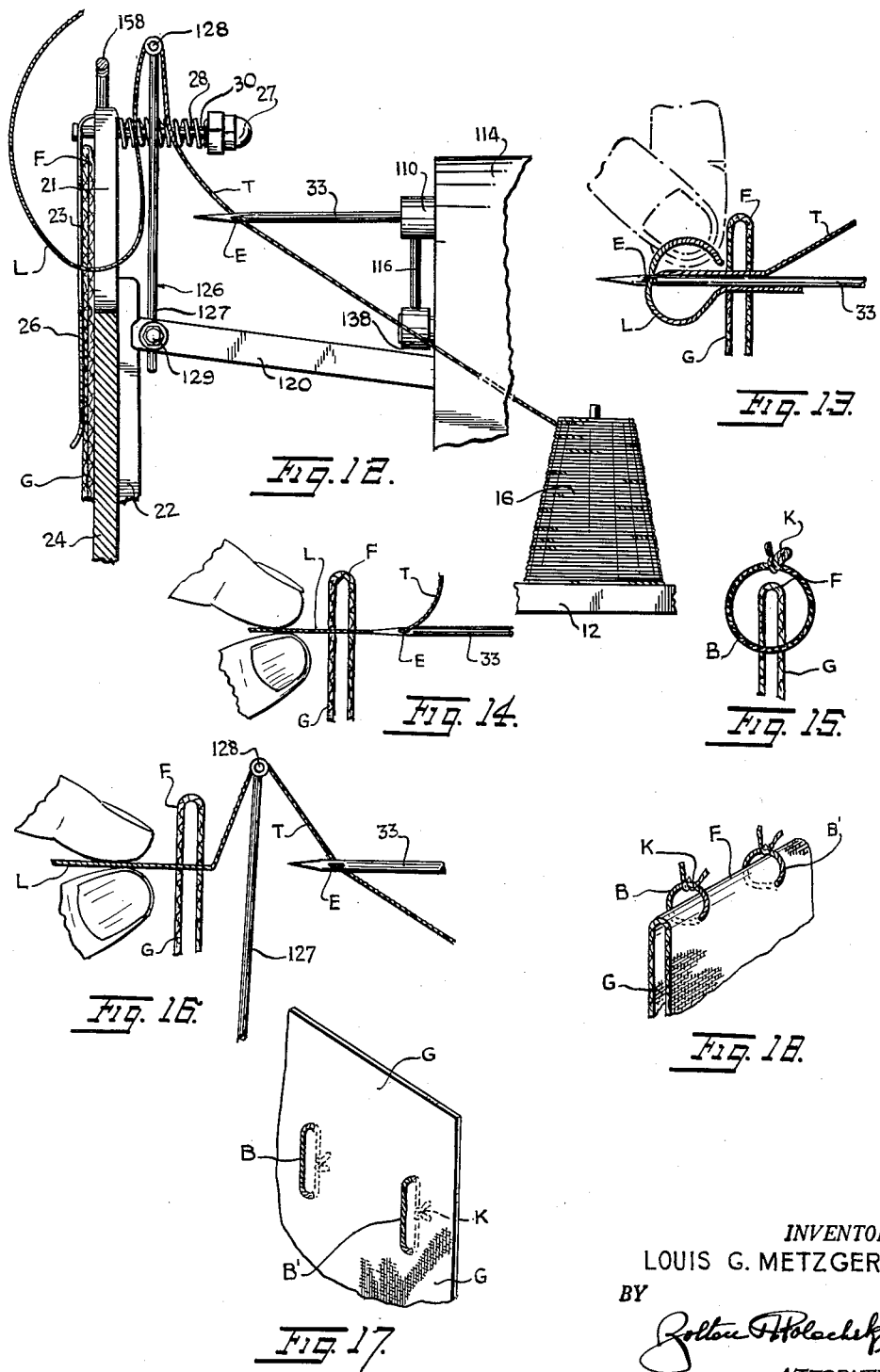
INVENTOR.
LOUIS G. METZGER
BY
ATTORNEY July 2, 1963

L. G. METZGER 3,095,842

APPARATUS AND CONTROL DEVICE FOR FORMING
BELT LOOPS ON GARMENTS

Filed April 25, 1961

INVENTOR.
LOUIS G. METZGER
BY
*[signature]*
ATTORNEY

United States Patent Office 3,095,842
Patented July 2, 1963

3,095,842
APPARATUS AND CONTROL DEVICE FOR FORMING BELT LOOPS ON GARMENTS
Louis G. Metzger, New York, N.Y., assignor to Alfred S. Minchenberg, Winchendon, Mass.
Filed Apr. 25, 1961, Ser. No. 105,408
5 Claims. (Cl. 112—104)

This invention relates to machines for forming belt loops on dresses and other garments.

Several types of machines have heretofore been proposed for forming belt loops which consist of lengths of thread or cord tied or fastened at the concealed inner side of material of a dress and having loop portions projecting through vertically spaced openings in the material of the dress or other garment.

These machines have not proven wholly satisfactory in practice due to the complexity of their mechanism which requires frequent and precise adjustment, which is costly to manufacture, and requires much skill to operate. Some of the prior machines were very slow and unreliable in operation because they relied upon electromagnetic or pneumatic drives for the mechanism .

The present invention overcomes the difficulties and disadvantages of prior machines used for forming thread type garment loops by providing a wholly mechanical arrangement for driving the mechanism of the machine. The machine is semi-automatic in that it performs only part of the loop forming operation, the actual tying of the threads to complete the loops being done manually by an operator of the machine.

A principal object is to provide a machine of the character described which will enable an operator to form a greater number of belt loops in a work period than has heretofore been possible through the use of conventional semi-automatic machines for belt loop forming.

A further object is to provide a machine of the character described including a novel clutch assembly for coupling and decoupling a motor and needle carrying drive shaft.

Another object is to provide a novel clutch assembly of general application in various types of machines requiring a forward thrust of a shaft, rod, plunger or piston member and a positive hold of the member in the forward position until released by declutching means.

A still further object is to provide a novel mechanism for driving a needle in a semi-automatic machine in forming thread or cord type belt loops.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 2 is a top plan view of the machine with cover removed, parts being shown in one position of operation.

FIG. 3 is another top plan view of the machine similar to FIG. 2 with parts in another position of operation.

FIG. 4 is a side elevational view of the machine, parts being disposed as in FIG. 2, portions of the mechanism being broken away.

FIG. 5 is a side elevational view of the machine opposite from the side view of FIG. 4.

FIG. 6 is a side elevational view of the machine, parts being disposed as in FIG. 3, portions of the mechanism being broken away.

FIG. 7 is a side elevational view of the machine, parts being disposed as in FIG. 3, the view being opposite to that of FIG. 6, parts of the mechanism being broken away.

FIG. 12 is a side elevational view on an enlarged scale of a front portion of the machine showing one step in the operation thereof.

FIGS. 13–16 are enlarged diagrammatic views showing progressive steps in the formation of a belt loop by use of the machine.

FIG. 17 is a perspective view of a piece of a garment removed from the machine showing two belt loops formed preparatory to unfolding the garment.

FIG. 18 is a perspective view of the same piece of garment as in FIG. 17, showing the garment unfolded with belt loops in completely formed position.

Figure 1:
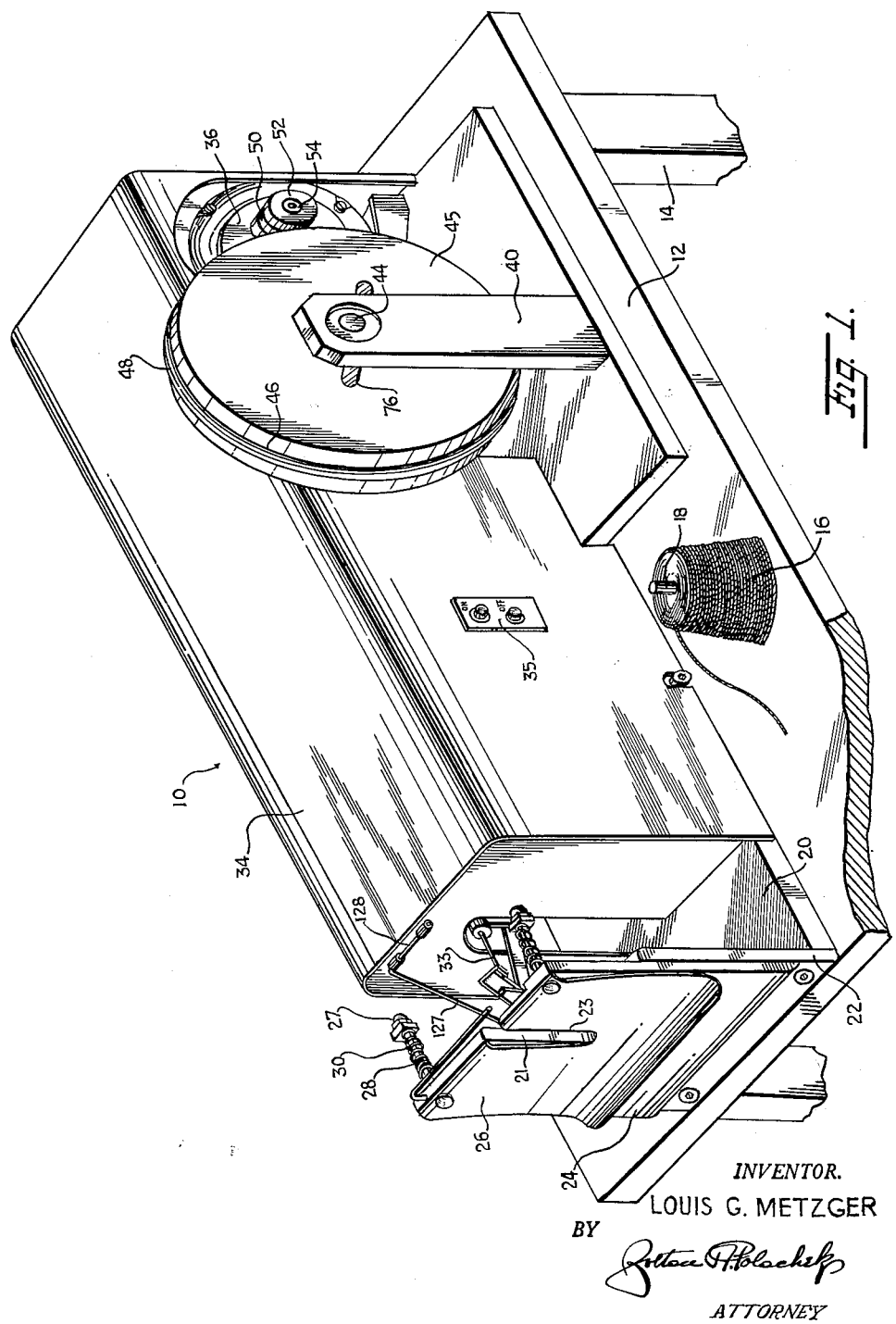
FIG. 1 is a perspective view of a machine embodying the invention, with cover on the machine, the machine being mounted on a table.

Referring to FIGS. 1–7, there is shown the machine embodying the invention denoted by the generic numeral 10. The machine is normally disposed on a table top 12 having legs 14 as shown in FIG. 1, at a suitable height for operation by an operator. On the table top is a spool 16 of thread or cord rotatably mounted on a spindle 18. During operation of the machine the thread is drawn from the spool as it rotates on the spindle.

Figure 10:
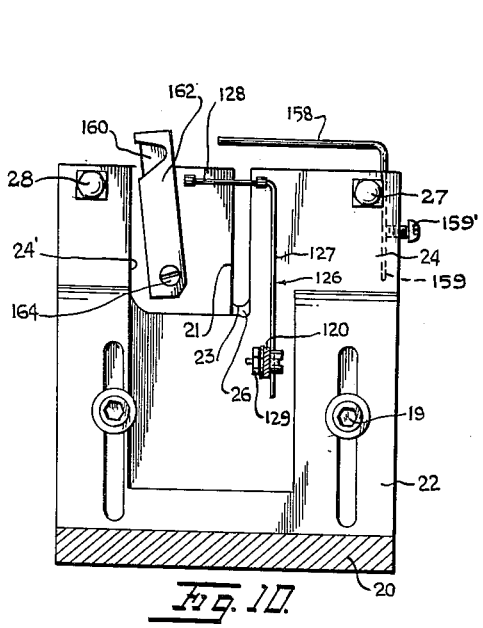
FIG. 10 is a vertical sectional view taken on line 10—10 of FIG. 2.
Figure 11:
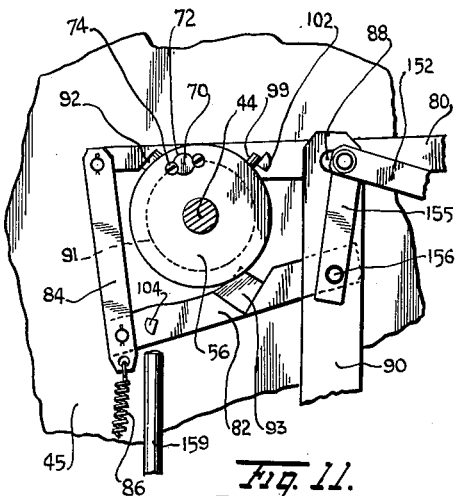
FIG. 11 is a side elevational view of part of the mechanism taken on line 11—11 of FIG. 2.

The machine 10 has a base plate 20 with forwardly located upstanding end wall 22 carrying an extension plate 24 on which is mounted a depending garment holder plate 26; see also FIG. 12. Plate 24 is secured by screws 19 (see FIG. 10). Plate 26 is supported on rods 28 slidably mounted in holes in end plate 24 and pressed against plate 24 by compressed springs 30 on the rods. Nuts 27 hold the springs on the rods. Both plates 24 and 26 have registering vertical, central slots 21, 23 through which needle 33 passes during operation of the machine.

On removable cover 34 shown in FIG. 1 is a switch 35 in circuit with an electric motor 36 for turning this motor on and off. The motor is energized via a power cord 38 shown in FIGS. 2, 3, 4 and 7, and having conductors connected to the switch and to a suitable source (not shown) of electric power.

Figure 19:
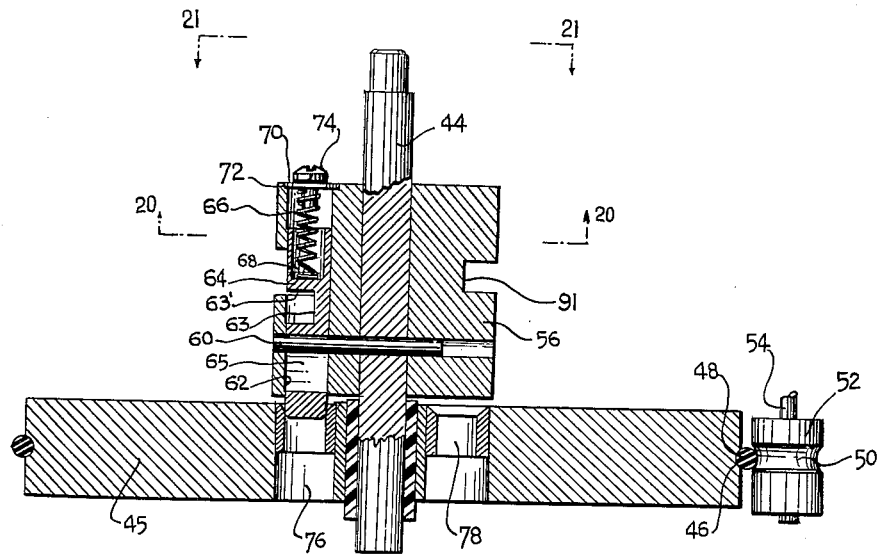
FIG. 19 is a horizontal sectional view on an enlarged scale taken on line 19—19 of FIG. 4.
Figure 20:
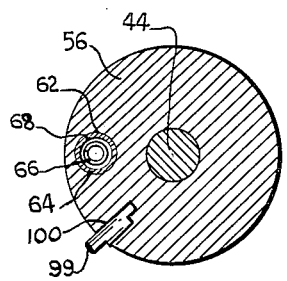
FIG. 20 is a vertical sectional view taken on line 20—20 of FIG. 19.
Figure 21:
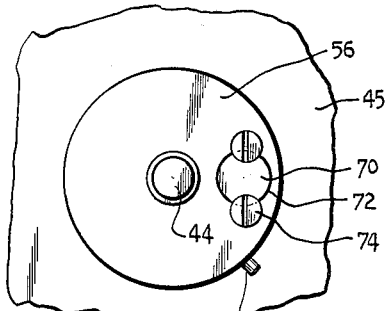
FIG. 21 is an end elevational view of a portion of the mechanism of FIG. 19, taken on line 21—21 of FIG. 19.
Figures 22, 23:
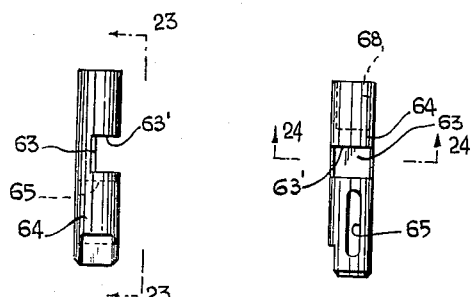
FIGS. 22 and 23 are side views, ninety degrees apart, of a slide pin employed in the clutch assembly of the machine.
Figure 24:
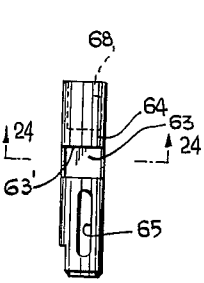
FIG. 24 is a sectional view on an enlarged scale taken on line 24—24 of FIG. 23.

On plate 20 are two spaced upstanding journal brackets 40, 42 which carry a rotatable shaft 44. On shaft 44 is a freely rotatably drive wheel 45; see also FIG. 19. This wheel has a circumferential groove 46 in which is engaged a rubber ring 48. The ring engages in a circumferential groove 50 of a drive roller 52 mounted on the end of motor shaft 54. During operation of the machine the motor drives the wheel 45 continuously, and the wheel runs freely. The wheel is normally out of engagement with a clutch cylinder 56 secured to the shaft 44 except when the mechanism of the clutch is actuated, as will be described.

The clutch cylinder shown in FIGS. 2–5, 7, 11 and 19–21, is secured to the shaft 44 by a pin 60 extending radially through the cylinder. The pin passes through a bore 62 extending longitudinally parallel to the axis of the cylinder. A clutch pin 64 (see FIGS. 19–24) is slidably mounted in the cylinder. The pin has a diametral slot 65 through which the pin 60 passes. A spring 66 seated in an axial bore 68 in one end of pin 64 biases the pin 64 toward the wheel 45. The spring is held in bore 68 by a disk 70 seated in a recess 72 in the outer end of the cylinder 56. Two screws 74 are threaded in the cylinder and their heads abut and hold the disk against the bias of compressed spring 66. Two spaced holes 76 diametrically aligned are formed in wheel 45 and radially spaced from the axis of the wheel the same distance that pin 64 is spaced from the axis of cylinder 56. Slide sleeves 78 line holes 76 and either one of the sleeves can receive the pin 64 when it is permitted to move axially to the wheel.

In order to retract and release the pin 64 for axial movement under control of the operator of the machine, there is provided a camming assembly including two coplanar camming blades 80, 82. The blades are connected at their forward ends by a link 84 held biased by a spring 86 toward plate 20; see FIGS. 5, 7 and 11. Upper blade 80 pivots on a pin 88 carried by spaced upstanding posts 90 on plate 20. At the lower edge of blade 80 and the upper edge of blade 82 are notches 92, 93 with slanted sides serving as camming elements. These notched camming elements are disposed to enter a circumferential groove 91 formed in the cylinder 56. In this groove is exposed a recess 63 formed in pin 64. When the side of either notch 92 or 93 engages a side 63' of recess 63, the pin 64 will be retracted from the wheel 45 to free the wheel from the clutch cylinder. This action occurs when either blade 80 is lowered or blade 82 is raised. The blades are actuated by means of a cord or chain 95 and pedal 96, best shown in FIG. 7. The pedal is normally elevated to the dotted line position shown in FIG. 7 by a coil spring 97 disposed at the joint of the pedal to a base plate 98. When the pedal is depressed by the operator of the machine, the blades 80 and 82 are pulled down so that upper blade 80 enters groove 91. When the pedal is released, the blades 80, 82 rise together and blade 82 enters groove 91. A pin 99 is fitted in a bore 100 in the cylinder and extends radially therefrom. This pin is disposed to be engaged by either one of stop pins 102, 104 mounted on sides of blades 80, 82.

Figure 8:
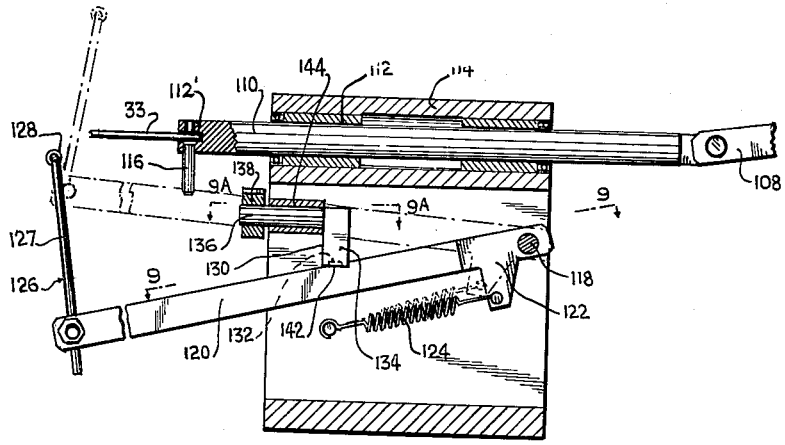
FIG. 8 is a vertical sectional view taken on line 8—8 of FIG. 2.
Figure 9:
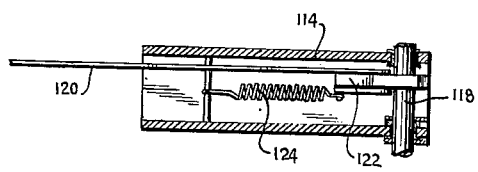
FIGS. 9 and 9A are sectional views taken on lines 9—9 and 9A—9A, respectively, of FIG. 8.
Figure 9A:
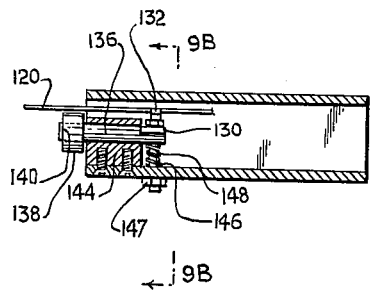
Figure 9B:
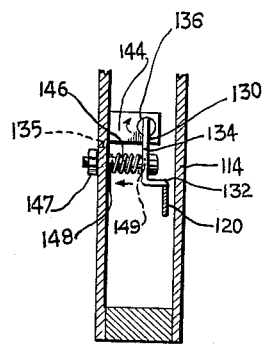
FIG. 9B is a sectional view taken on line 9B—9B of FIG. 9A.
Figure 9C:
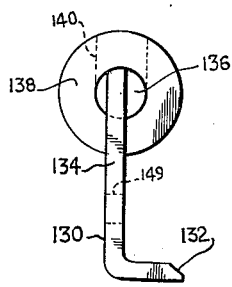
FIG. 9C is an end elevational view of a cammed latch assembly employed in the machine.
Figure 9D:
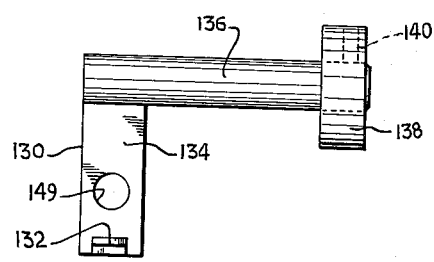
FIG. 9D is a side elevational view of the cammed latch assembly of FIG. 9C.

On shaft 44 is secured a crank 106 to which is linked a pitman bar 108. To the bar is connected a plunger 110 axially reciprocated in a sleeve bearing 112 disposed at the top of an open end bearing housing 114; see FIG. 8. The forward end of plunger 110 is provided with a bore 112' in which needle 33 is fitted. The plunger carries a cam operating finger 116 depending radially from the shaft at its forward end. Pivotally mounted on a shaft 118 in housing 114 is a bar 120. This bar is provided with a short depending bracket arm 122 on which is engaged a coil spring 124. The spring tends to bias the bar to the elevated dotted line position shown in FIG. 8. Bar 120 carries a right-angled thread lifter wire 126 having a portion 127 adjustable in a vertical plane and a horizontal portion 128 extending across and to the rear of slot 23 in plate 24; see FIG. 10. This thread lifter wire 126 may be adjusted vertically by a setting screw and nut unit 129. In order to hold the bar 120 in a depressed position shown in solid lines in FIG. 8, there is provided a latching means including an L-shaped finger 130; see FIGS. 9A–9D. The finger has a beveled end 132. Its vertical section 134 is secured to a shaft 136 on which is mounted a cam 138. The cam has a camming surface 140 disposed to be engaged by cam operating finger 116 on plunger 110 at the forward open end of the housing 114. A cutout or recess 142 is formed in the top edge of bar 120. Finger 130 engages in this recess to hold the bar 120 depressed. Shaft 136 is journaled in a bearing block 144 and is turnable angularly to project the finger 130 laterally so as to obstruct the arm 120 and prevent it from rising. A spring 146 on a pin or bolt 148 urges the finger 130 to this obstructing position as clearly shown in FIG. 9B.

The pin 148 is secured in a hole 149 formed in finger section 134. A nut 147 is threaded on the end of pin 148 outside housing 114. The pin is movable in a hole 135 formed in the side of housing 114. When finger 116 engages the cam 138 while plunger 110 is being retracted during operation of the machine, the cam 138 and shaft 136 are turned against the bias in spring 146 to move finger 132 clear of bar 120 so that the bar rises to raise the thread lifter wire 126.

In order to lower the bar 120 against the tension of spring 124, there is provided a crank 150 secured to shaft 118 engaged by a link 152 between crank pin 151 and a crank bar 155. Link 152 has fingers 153 slidable at the sides of crank pin 151 to provide a lost motion action so that link 152 can retract without binding on pin 151, but the link will engage and drive the pin 151 and crank 150 when the link is moved in a forward direction. Crank bar 155 is angularly movable on a shaft 156 secured to and turned by the lower blade 82 of the clutch assembly. Posts 157 and 159 mounted upright on plate 20 serve as stops to limit downward movement of blades 80, 82.

A knot tying bar 158 is adjustably secured in a vertical bore 159 within the plate 24 by a set screw 159' and extends horizontally over the plate at the front of the machine. A thread cutting blade 160 is mounted in a support 162 secured in recess 24' at the rear of plate 24 by a screw 164; see FIG. 10.

In operation, the waist portion of the dress or the like garment G is folded once upon itself and the fold F inserted upwardly between the clamping plate 26 and the plate 24 across the slots 23 and 21 in the plates 26 and 24, respectively. The fold F is clamped in this position by the plate 26 acted upon by the springs 30; see FIG. 12. The free end of the thread T on spool 16 is threaded through the eye E of the needle 33.

When switch 35 is in ON position and motor 36 is running the driving wheel 45 is disengaged from clutch cylinder 56, through blade 80. The operator depresses pedal 96 swiftly, thereby an upward motion of cam portion 92 of blade 80 will release pin 64 which will engage in slide sleeve 78 thereby driving cylinder 56. Simultaneously lifter 126 is lowered so that its arm 128 is below the line of movement of needle 33. The arm 120 is depressed and held by engagement of finger 132 in the recess 142 formed in arm 120; see FIG. 8.

The turning cylinder angularly turns shaft 44 and crank arm 106 to advance link 108 and plunger 110 from the position of FIGS. 2 and 4 so that the needle 33 is driven forwardly through the folded garment to the position of FIGS. 3, 6 and 7. The crank arm 106 continues to turn and the needle 33 is pulled back slightly from the position shown in FIGS. 6 and 7. Due to friction between the fabric and the thread, a loop L forms in the thread as shown in FIG. 13.

The loop L is formed as the needle retracts when disengagement of the clutch cylinder and wheel occurs. This is the position when the plunger 110 reaches the end of its forward stroke. This is effected because blade 82 is disposed upwardly in groove 91 in cylinder 56, so that the side of notch 93 engages side 63' of recess 63 in pin 64 and retracts the pin from the wheel 45. Due to inertia the cylinder 56 continues to rotate only a few more angular degrees until pin 99 engages stop in 104, whereupon the cylinder rotation is stopped and needle 33 is held in the above described forward position. Wheel 45 continues to rotate freely on shaft 44 which is now stationary.

The operator grasps the loop L as shown in FIG. 13 and holds it while releasing pedal 96 as shown in FIG. 14. Spring 86 pulls both blades 80 and 82 tilting blade 80 into the groove 91 while blade 82 is disengaged from groove 91. Disengagement of pin 99 and stop pin 104 occurs and the rotating wheel 45 at once becomes engaged by the released pin 64 which is being urged against the wheel 45 by spring 66 so that the pin enters the first slide sleeve 78 of the driving wheel 45. Now the cylinder 56 is turned further and pitman bar 108 retracts rearwardly along with plunger 110 and needle to the fully retracted position of FIG. 2. This is the extreme rearward position of the plunger 110. It is due to the disengagement of the clutch pin 64 from the slide sleeve 78 of the wheel 45, caused by the present position of the cam 92 of blade 80. The cylinder 56 rotates by inertia until pin 99 engages stop pin 102 whereupon the cylinder rotation stops. This point of stoppage is the most retracted position of plunger 110. There the finger 116 engages cam 138 and turns the cam and shaft 136 angularly to release bar 120 which raises the thread lifter 126 by the action of the spring 124. The lifter arm 128 raises the portion of the thread between retracted needle 33 and the plate 24 as shown in FIG. 16 while the operator holds the thread. As the lifter rises more thread is drawn through the eye of the needle from spool 16.

Now the operator carries the free end of the thread over the guide arm 158 as shown in FIG. 12 and ties a knot with the thread elevated by lifter arm 128. The operator then cuts the thread T on blade 160. This completes the forming of the belt loop B with knot K shown in FIG. 15.

When bar 120 is lowered through linkage action, it pushes finger 130 aside through the tapered surface. The finger 130 then snaps back under spring action.

The machine is now in condition to begin another cycle for forming another belt loop B'. The operator depresses pedal 96 to advance the needle, then releases the pedal to fully retract the needle and raise lifter 126. It will be noted that the lifter 126 and bar 120 are lowered when the operator depresses the pedal. The crank arm 155 is turned by shaft 156 and link 152 is advanced to turn crank arm 150 and lower arm bar 120. When the crank arm 155 is turned oppositely as the pedal is released, the bar 120 remains engaged because of lost motion provided by fingers 153 of bar 152 at pin 151. The mechanism is phased so that the bar 120 is released as the shaft 110 is fully retracted and rotation of the cylinder 56 stops while finger 116 engages and turns cam 138.

The operator will remove the folded garment from the machine with loops B, B' formed around the fold F as shown in FIG. 18. When the garment is straightened out, as shown in FIG. 17, the knots K will be located at the rear or inner side of the garment and the belt loops B, B' will be ready for receiving a belt.

The mechanism of the machine is so devised that a positive hold is maintained of the plunger 110 in the forwardly thrust position and a positive hold in a retracted position. This is effected by the stopping of the clutch cylinder upon engagement of pin 99 with stop members 102 and 104. This forward thrust is maintained under control of the depressed pedal. When the pedal is released the retraction of the plunger 110 occurs. This mode of operation of the mechanism is applicable in other types of machines such as punch presses, extrusion presses, forging presses, and other machines where it is required to advance a plunger or shaft axially and then to hold it in the advanced position for a period of time after which the plunger is retracted.

While I have illustrated and described the preferred embodiment of my invention, it is to be understood that I do not limit myself to the precise construction herein disclosed and that various changes and modifications may be made within the scope of the invention defined in the appended claims.

Having thus described my invention, what I claim as new and desire to secure by United States Letters Patent is:

1. In a machine for forming belt loops, a plunger carrying a needle axially thereon, a drive motor, a clutch cylinder secured axially on a shaft, a drive wheel freely rotatable on said shaft, said wheel having a hole, means of connection between said motor and wheel driving the wheel continuously on said shaft, an axially movable member in said cylinder engageable in the hole in said wheel rotating said cylinder, blade means disposed to retract said member from the hole in the wheel, a linkage connecting the plunger and cylinder advancing and retracting said needle while said member is engaged in said hole in the wheel, said blade means being a pair of blades operatively connected by linkage and pivotally mounted for pivoting under control of a pedal, stop members carried by said blades, and a radially projecting pin carried by said cylinder disposed to engage said stop members and hold the cylinder against rotation after said member is retracted from the hole in the wheel, with the plunger in either a forwardly extended position or in a retracted position.

2. In a machine for forming belt loops, a plunger carrying a needle axially thereon, a drive motor, a clutch cylinder secured axially on a shaft, a drive wheel freely rotatable on said shaft, said wheel having a hole, means of connection between said motor and wheel driving the wheel continuously on said shaft, an axially movable member in said cylinder engageable in the hole in said wheel rotating said cylinder, blade means disposed to retract said member from the hole in the wheel, a linkage connecting the plunger and cylinder advancing and retracting said needle while said member is engaged in said hole in the wheel, said blade means being a pair of blades operatively connected by linkage and pivotally mounted for pivoting under control of a pedal, stop members carried by said blades, a radially projecting pin carried by said cylinder disposed to engage said stop members and hold the cylinder against rotation after said member is retracted from the hole in the wheel, with the plunger in either a forwardly extended position or in a retracted position, a thread lifter, a spring biased bar pivotally mounted on a support and carrying said thread lifter to elevate the same across the path of axial movement of said needle, latch means carried by said support disposed to hold said bar in a depressed position with said lifter located below said path, and cam means on said latch means disposed for movement by said plunger in the retracted position to release said latch means.

3. In a machine for forming belt loops, a plunger carrying a needle axially thereon, a drive motor, a clutch cylinder secured axially on a shaft, a drive wheel freely rotatable on said shaft, said wheel having a hole, means of connection between said motor and wheel driving the wheel continuously on said shaft, an axially movable member in said cylinder engageable in the hole in said wheel rotating said cylinder, blade means disposed to retract said member from the hole in the wheel, a linkage connecting the plunger and cylinder advancing and retracting said needle while said member is engaged in said hole in the wheel, said blade means being a pair of blades operatively connected by linkage and pivotally mounted for pivoting under control of a pedal, stop members carried by said blades, a radially projecting pin carried by said cylinder disposed to engage said stop members and hold the cylinder against rotation after said member is retracted from the hole in the wheel, with the plunger in either a forwardly extended position or in a retracted position, a thread lifter, a spring biased bar pivotally mounted on a support and carrying said thread lifter to elevate the same across the path of axial movement of said needle, latch means carried by said support disposed to hold said bar in a depressed position with said lifter located below said path, and cam means on said latch means disposed for movement by said plunger in the retracted position to release said latch means, and a crank and lever means operatively connecting said bar and blade means for pivoting said blades when actuated by said pedal and turning the crank and lever means to lower said bar for engagement by said latch means.

4. In a machine having a plunger, linkage means for axially advancing and retracting said plunger, a drive wheel, a rotatable clutch cylinder having a member selectively engaging and disengaging said wheel in projecting and retracted positions in said clutch cylinder, said linkage means being operatively connected to said clutch cylinder, for advancing the plunger during one portion of a revolution thereof and retracting the plunger during another portion of said revolution, means including a pair of link-connected blades under control of an operator to retract said member, stop elements carried by the blades, a stop member carried by said clutch cylinder disposed to engage said stop elements in two different positions of the cylinder and stop rotation of the cylinder after said member is disengaged from said wheel so that the plunger is held selectively in precise advanced and retracted positions of said plunger, a shaft affixed to and carrying said cylinder, said wheel being freely rotatable on said shaft, and motor means rotatably driving said wheel continuously while said member intermittently engages said wheel and is retracted therefrom under control of the operator.

5. In a machine for forming belt loops, a plunger carrying a needle axially thereon, a drive motor, a clutch cylinder secured axially on a shaft, a drive wheel freely rotatable on said shaft, said wheel having a hole, means of connection between said motor and wheel driving the wheel continuously on said shaft, an axially movable member in said cylinder engageable in the hole in said wheel rotating said cylinder blade means disposed to retract said member from the hole in the wheel, a linkage connecting the plunger and cylinder advancing and retracting said needle while said member is engaged in said hole in the wheel, said blade means being a pair of blades operatively connected by linkage and pivotally mounted for pivoting under control of a pedal, a thread lifter, a spring biased bar pivotally mounted on a support and carrying said thread lifter to elevate the same across the path of axial movement of said needle, latch means carried by said support disposed to hold said bar in a depressed position with said lifter located below said path, and cam means on said latch means disposed for movement by said plunger in the retracted position to release said latch means.

References Cited in the file of this patent
UNITED STATES PATENTS

| | | |
|---|---|---|
| 1,487,262 | Osgood | Mar. 18, 1924 |
| 2,601,835 | Golden | July 1, 1952 |
| 2,901,068 | Tipper | Aug. 25, 1959 |
| 2,906,218 | Minchenberg | Sept. 29, 1959 |